United States Patent
Freyensee et al.

(10) Patent No.: US 11,429,280 B2
(45) Date of Patent: *Aug. 30, 2022

(54) COMPUTER PRODUCT, METHOD, AND SYSTEM TO DYNAMICALLY MANAGE STORAGE DEVICES ACCESSED REMOTELY OVER A NETWORK

(71) Applicant: INTEL CORPORATION, Santa Clara, CA (US)

(72) Inventors: James P. Freyensee, Hillsboro, OR (US); Dave B. Minturn, Hillsboro, OR (US); Phil C. Cayton, Warren, OR (US); Jay E. Sternberg, North Plains, OR (US); Anthony J. Knapp, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/847,095

(22) Filed: Apr. 13, 2020

(65) Prior Publication Data
US 2020/0241749 A1    Jul. 30, 2020

Related U.S. Application Data

(63) Continuation of application No. 15/167,908, filed on May 27, 2016, now Pat. No. 10,620,840.

(51) Int. Cl.
*G06F 3/06* (2006.01)
(52) U.S. Cl.
CPC .............. *G06F 3/061* (2013.01); *G06F 3/067* (2013.01); *G06F 3/0632* (2013.01);
(Continued)

(58) Field of Classification Search
CPC ........................... G06F 3/0665; G06F 3/0662
See application file for complete search history.

(56) References Cited

U.S. PATENT DOCUMENTS

| 7,653,699 B1 | 1/2010 | Colgrove et al. |
| 10,013,168 B2 | 7/2018 | Cayton et al. |

(Continued)

OTHER PUBLICATIONS

International Search Report and Written Opinion for International Application No. PCT/US2017/029982, dated Jul. 28, 2017, 14 pp. [77.346PCT (ISR & WO)].‡

(Continued)

*Primary Examiner* — Baboucarr Faal
(74) *Attorney, Agent, or Firm* — Compass IP Law PC

(57) ABSTRACT

A computer product, method, and system to generate a virtual subsystem to process read and write requests to storage devices. A virtual controller is configured in a memory device to provide a representation of a controller in a computer system. At least one virtual storage is configured in the memory device. A virtual storage is assigned a quantity of physical storage configured in a plurality of storage devices, wherein the virtual storage maps to addresses in the quantity of physical storage. At least one virtual storage is assigned to a virtual controller. A host is assigned to the virtual storage assigned to the virtual controller. The host assigned the virtual storage is allowed to direct read and write requests to the quantity of physical storage assigned to the virtual storage.

22 Claims, 8 Drawing Sheets

(52) U.S. Cl.
CPC .......... *G06F 3/0659* (2013.01); *G06F 3/0665* (2013.01); *G06F 3/0683* (2013.01)

(56) References Cited

U.S. PATENT DOCUMENTS

| | | | |
|---|---|---|---|
| 10,275,160 B2 | 4/2019 | Freyensee et al. | |
| 2002/0095479 A1* | 7/2002 | Schmidt | G06F 16/192 709/218 |
| 2010/0114889 A1‡ | 5/2010 | Rabii | G06F 16/1824 707/73 |
| 2014/0281040 A1‡ | 9/2014 | Liu | G06F 13/16 710/3 |
| 2015/0143134 A1‡ | 5/2015 | Hashimoto | G06F 21/6209 713/19 |
| 2015/0319237 A1‡ | 11/2015 | Hussain | G06F 3/061 709/21 |
| 2016/0085718 A1‡ | 3/2016 | Huang | H04L 29/08 709/21 |
| 2017/0344259 A1 | 11/2017 | Freyensee et al. | |
| 2018/0004559 A1 | 1/2018 | Geml et al. | |
| 2018/0088978 A1 | 3/2018 | Li et al. | |

OTHER PUBLICATIONS

International Preliminary Report on Patentability for International Application No. PCT/US2017/029982, dated Dec. 6, 2018, 11 pp. [77.346PCT (IPRP)].‡

Sardella, S., "NVMe Over Fabrics Agenda", Aug. 11, 2015, NVM Express, Total 14 pp.‡

U.S. Appl. No. 14/998,061, filed Dec. 24, 2015, entitled "Method and Apparatus for Disaggregating NVME Storage Controller Stack", invented by Clayton, P.C. et al. [P89860 (Appln)].‡

U.S. Appl. No. 14/976,949, filed Dec. 21, 2015, entitled "Method and Apparatus to Enable Individual NVMe IO Queues on Differing Network Addresses of an NVMe Controller", invented by Freyensee, J.P. et al. [P88689 (Appln)].‡

NVM Express, Inc., "NVM Express", Revision 1.2a, Oct. 23, 2015, © Copyright 2007—2015 NVM Express, Inc., Total 209 pp.‡

Onufryk, P., "What's New in NVMe 1.1 and Future Directions", NVM Express, Flash Memory Summit 2013, Santa Clara, CA, Total 26 pp.‡

Minturn, D., "NVM Express Over Fabrics", Mar. 15-18, 2015, NVM Express, Total 13 pp.‡

Office Action 1 for U.S. Appl. No. 15/167,908, dated May 18, 2018, 23 pp. [77.346 (OA1)].

Response to Office Action 1 for U.S. Appl. No. 15/167,908, dated Aug. 20, 2018, 13 pp. [77.346 (ROA1)].

Final Office Action 1 for U.S. Appl. No. 15/167,908, dated Dec. 28, 2018, 11 pp. [77.346 (FOA1)].

Response to Final Office Action 1 for U.S. Appl. No. 15/167,908, dated Mar. 14, 2019, 13 pp. [77.346 (R-FOA1)].

Advisory Action 1 for U.S. Appl. No. 15/167,908, dated Apr. 17, 2019, 5 pp. [77.346 (AdvAct)].

Office Action 3 for U.S. Appl. No. 15/167,908, dated May 16, 2019, 16 pp. [77.346 (OA3)].

Response to Office Action 3 for U.S. Appl. No. 15/167,908, dated Aug. 16, 2019, 16 pp. [77.346 (ROA3)].

Notice of Allowance 1 for U.S. Appl. No. 15/167,908, dated Dec. 4, 2019, 5 pp. [77.346 (NOA1)].

List of Patents or Patent Applications Treated as Related, Apr. 10, 2020, 2 pp. [77.346C1].

\* cited by examiner

‡ imported from a related application

COMPUTER PRODUCT, METHOD, AND SYSTEM TO DYNAMICALLY MANAGE STORAGE DEVICES ACCESSED REMOTELY OVER A NETWORK

CROSS-REFERENCE TO RELATED APPLICATION

This application is a continuation of U.S. patent application Ser. No. 15/167,908, filed May 27, 2016, which application is incorporated herein by reference in its entirety.

TECHNICAL FIELD

Embodiments described herein generally relate to a computer product, method, and system to dynamically manage storage devices accessed remotely over a network.

BACKGROUND

Non-Volatile Memory Express (NVMe) is a logical device interface (http://www.nvmexpress.org) for accessing non-volatile storage media attached via a Peripheral Component Interconnect Express (PCIe) bus. The non-volatile storage media may comprise a flash memory and solid solid-state drives (SSDs). NVMe is designed for accessing low latency storage devices in computer systems, including personal and enterprise computer systems, and is also deployed in data centers requiring scaling of thousands of low latency storage devices. A computer system may communicate read/write requests over a network to a target system managing access to multiple attached storage devices, such as SSDs. The computer system may send communicate the read/write requests using an ANSI Standard Small Computer System Interface (SCSI) read/write command over the network. The receiving target system converts the SCSI read/write request to an NVMe request compatible with the SSD in the target system.

BRIEF DESCRIPTION OF THE DRAWINGS

Embodiments are described by way of example, with reference to the accompanying drawings, which are not drawn to scale, in which like reference numerals refer to similar elements.

DESCRIPTION OF EMBODIMENTS

Figure 1:
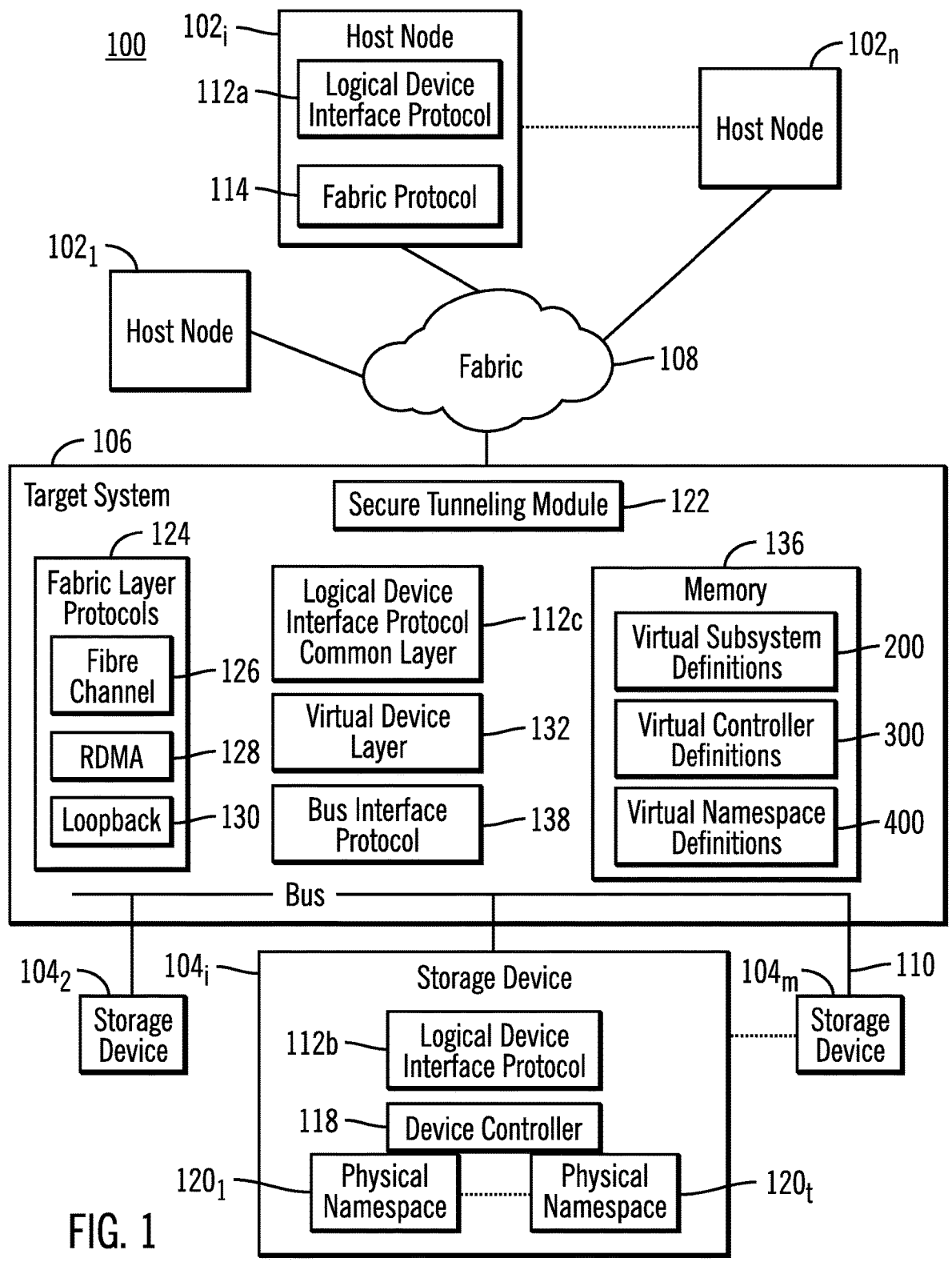
FIG. 1 illustrates an embodiment of a storage environment

A target system includes an NVMe subsystem with one or more controllers to manage read/write requests to namespace identifiers (NSID) defining ranges of addresses in the connected storage devices. The hosts may communicate to the NVMe subsystem over a fabric or network or a PCIe bus and port. Each network or PCIe port may connect to one NVMe subsystem, and the NVMe subsystem may communicate with the attached storage devices using a PCIe bus.

Described embodiments provide techniques for virtualizing subsystems, controllers, and namespaces to present to host systems to perform Input/Output (I/O) operations with respect to physical namespaces in storage devices assigned to virtual subsystems and virtual controllers. Host systems are assigned to virtual subsystems and to virtual namespaces that map to physical namespaces in the storage devices. The host transmits a read/write request using a logical device interface protocol, such as NVMe, to a target system in which the virtual subsystems and virtual namespaces are implemented. The target system translates the virtual namespace in the read/write request in the logical device interface protocol to the corresponding physical namespace and sends the read/write request in the same logical device interface protocol, e.g., NVMe, to the storage device to process. For instance, the described embodiments may be deployed in NVMe-over-Fabric environments, where host systems communicate with an NVMe subsystem over a network interface (such as Ethernet, Remote Direct Memory Access (RDMA)-based networks, Fibre Channel based networks). A network port may connect to one NVMe subsystem, and the NVMe subsystem may communicate with the attached storages devices using a Peripheral Component Interconnect Express (PCIe) bus.

Described embodiments improve latency, because a read/write request from a host system that is directed to a storage device is included or encapsulated in a logical device interface protocol that can be processed directly at the storage device without having to be translated or converted from one protocol to another. In environments where the host communicates with the virtual subsystems over a fabric, such as an NVMe-over-Fabrics environment, the host may encapsulate the read/write request in the logical device interface protocol used at the storage device in a fabric packet for transmission through a fabric network. The target system receiving the fabric packet may then extract the read/write request encapsulated in the logical device interface protocol, which is further encapsulated in the fabric packet, and substitute the physical namespace to which the target virtual namespace in the read/write request maps before forwarding to the storage device over a bus, e.g., a PCIe bus. Described embodiments reduce latency in the transmission of the requests to the storage device by avoiding having to convert the read/write request from one protocol to another through the use of a virtual subsystem and virtual namespaces realized in the target system.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Certain embodiments relate to storage device electronic assemblies. Embodiments include both devices and methods for forming electronic assemblies.

FIG. 1 illustrates an embodiment of a storage environment 100 having a plurality of host nodes $102_1 \ldots 102_n$ that communicate with multiple storage devices $104_1 \ldots 104_m$ via a target system 106. The host nodes $102_1 \ldots 102_n$ communicate with the target system 106 over a fabric 108, and the target system 106 communicates with the storage devices $104_1 \ldots 104_m$ over a bus interface 110. Each of the host nodes $102_1 \ldots 102_n$, includes, as shown with respect to host node $102_i$, a logical device interface protocol 112a to perform read/write operations with respect to the storage devices $104_1 \ldots 104_m$ and a fabric protocol 114 to communicate over the fabric 108. Each of the storage devices $104_1 \ldots 104_m$ may include, as shown with respect to storage device $104_i$, a logical device interface protocol 112b, the same as the logical device interface protocol 112a, a device controller 118 to perform storage device $104_i$ operations, and one or more physical namespaces $120_1 \ldots 120_r$. A physical namespace comprises a quantity of non-volatile memory that may be formatted into logical blocks. When formatted, a namespace of size n is a collection of logical blocks with logical block addresses from 0 to (n−1). The namespaces may further be divided into partitions or ranges of addresses. The physical namespaces $120_1 \ldots 120_t$ are identified by a namespace identifier (NSID) used by the device controller 118 to provide access to the namespace $120_1 \ldots 120_r$.

The target system 106 may include a secure tunneling mode module 122 for secure communications from the host nodes $102_1 \ldots 102_n$, and one or more fabric layer protocols 124, compatible with the fabric protocol 114 used by the host nodes $102_1 \ldots 102_n$. The target system 106 may support multiple fabric layer protocols, such as Fibre Channel 126, Remote Direct Memory Access (RDMA) 128, loopback interface 130, etc. The target system 106 includes an instance of the logical device interface protocol common layer 112c to process the logical device interface protocol communications communicated from the host nodes $102_1 \ldots 102_n$. The virtual device layer 132 generates and manages virtualization definitions in a target system memory 136 that provide representations of target hardware and physical namespaces to the host nodes $102_1 \ldots 102_n$, including virtual subsystem definitions 200, virtual controller definitions 300, and virtualization namespace definitions 400. The target system 106 further includes a bus interface protocol 138 to transmit logical device interface protocol read/write requests to the storage devices $104_1 \ldots 104_m$.

In one embodiment, the logical device interface protocol 112a, 112b, 112c may comprise the Non-Volatile Memory Express (NVMe) protocol and the bus 110 and bus interface protocol 138 may comprise a Peripheral Component Interconnect Express (PCIe) bus. With described embodiments, a same NVMe read/write request may be transmitted from the host nodes $102_1 \ldots 102_n$ to the storage devices $104_1 \ldots 104_m$ without the need for conversion from one protocol to another. This use of the same logical device protocol request, e.g., NVMe, reduces latency in transmissions between the host nodes $102_1 \ldots 102_n$ and storage devices $104_1 \ldots 104_m$.

The address space of each of the namespaces in the storage devices $104_1 \ldots 104_m$ may be divided into one or more namespaces partitions, where each partition comprises a subset of addresses in a physical namespace $120_1 \ldots 120_r$. The host nodes $102_1 \ldots 102_n$ may further comprise any type of compute node capable of accessing storage partitions and performing compute operations.

The program components of the target system, such as 122, 124, 114c, 132, 138 may be implemented in a software program executed by a processor of the target system 106, firmware, a hardware device, or in application specific integrated circuit (ASIC) devices, or some combination thereof.

The storage devices $104_1, 104_2 \ldots 104_m$ may comprise electrically erasable and non-volatile memory cells, such as flash storage devices. For instance, the storage devices $104_1, 104_2 \ldots 104_m$ may comprise NAND dies of flash memory cells. In one embodiment, the NAND dies may comprise a multilevel cell (MLC) NAND flash memory that in each cell records two bit values, a lower bit value and an upper bit value. Alternatively, the NAND dies may comprise single level cell (SLC) memories or three bit per cell (TLC) memories. The storage devices $104_1, 104_2 \ldots 104_m$ may also comprise, but not limited to, ferroelectric random-access memory (FeTRAM), nanowire-based non-volatile memory, three-dimensional (3D) cross-point memory, phase change memory (PCM), memory that incorporates memristor technology, Magnetoresistive random-access memory (MRAM), Spin Transfer Torque (STT)-MRAM, a single level cell (SLC) Flash memory and other electrically erasable programmable read only memory (EEPROM) type devices. The storage devices $104_1, 104_2 \ldots 104_m$ may also comprise a magnetic storage media, such as a hard disk drive etc.

The target system memory 136 may comprise a non-volatile or volatile memory type of device known in the art, such as a Flash Memory, a non-volatile dual in-line memory module (NVDIMM), Dynamic Random Access Memories (DRAMs), etc., or may also comprise, but not limited to, ferroelectric random-access memory (FeTRAM), nanowire-based non-volatile memory, three-dimensional (3D) cross-point memory, phase change memory (PCM), memory that incorporates memristor technology, Magnetoresistive random-access memory (MRAM), Spin Transfer Torque (STT)-MRAM, a single level cell (SLC) Flash memory and other electrically erasable programmable read only memory (EEPROM) type devices, such as magnetic storage media, such as a hard disk drive etc. In certain embodiments, the target system memory 136 comprises a persistent, non-volatile storage of the virtual subsystem, virtual controller, and virtual namespace definitions to provide persistent storage over power cycle events.

Figure 2:
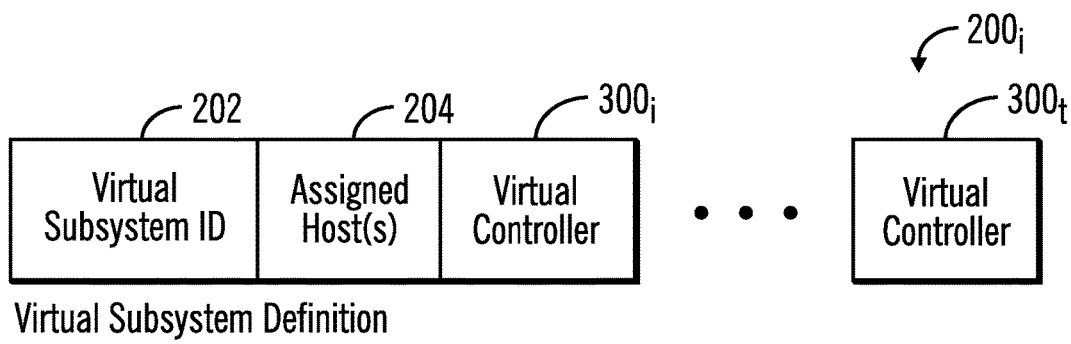
FIG. 2 illustrates an embodiment of a virtual subsystem definition to represent a subsystem to attached hosts.

FIG. 2 illustrates an embodiment of a virtual subsystem definition $200_i$ defining one of the virtual subsystems 200 configured in the target system 106, and includes: a virtual subsystem identifier (VSSID) 202; assigned hosts 204 comprising zero or more hosts assigned to use that virtual subsystem 202 to access the below storage devices $104_1 \ldots 104_m$; and one or more virtual controllers $300_1 \ldots 300_t$ configured in the virtual subsystem 202.

Figure 3:
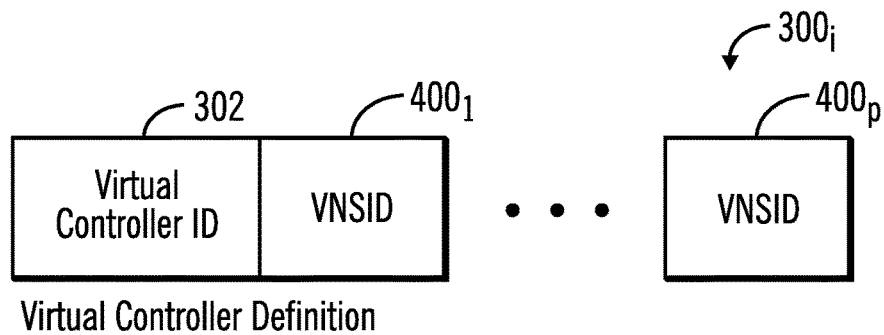
FIG. 3 illustrates an embodiment of a virtual controller definition within one of the virtual subsystems.

FIG. 3 illustrates an embodiment of a virtual controller definition $300_i$ to define one of the virtual controllers 300 configured in the target system 106, and includes: a virtual controller (VC) identifier 302 and one or more virtual namespaces $400_1 \ldots 400_p$, identified by a VNSID, assigned to that virtual controller 302. A virtual controller $300i$ may also have no assigned virtual namespaces.

Figure 4:
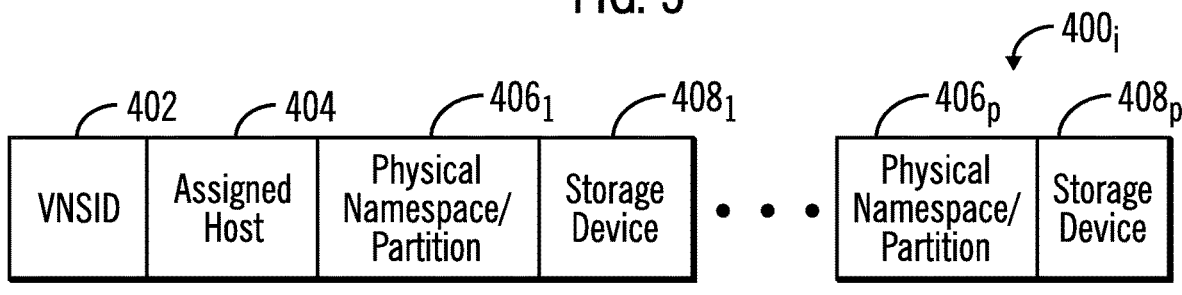
FIG. 4 illustrates a virtual namespace definition to define a virtual namespace that maps to a physical namespace/partition.

FIG. 4 illustrates an embodiment of a virtual namespace definition $400i$, and includes: a virtual namespace identifier (VNSID) 402; an assigned host 404 assigned to use the VNSID 402 to access a physical namespace; one or more assigned physical namespace/partitions 406$_1$ ... 406$_p$ and the storage device 408$_1$ ... 408$_p$ including the physical namespace/partition 406$_1$ ... 406$_p$. In certain embodiments, indication may be made in the assigned host 404 field or other part of the definition 400$_i$ to allow any host, multiple hosts or no host to use the VNSID to access a physical namespace.

Figure 5:
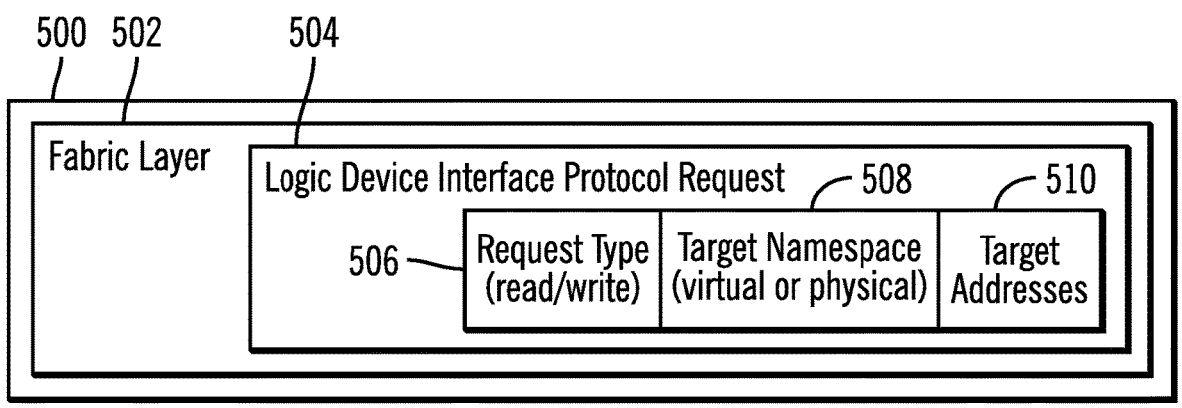
FIG. 5 illustrates an embodiment of a fabric packet.

FIG. 5 illustrates an embodiment of a fabric packet 500 for transmission across the fabric 108 having a fabric layer 502, including fabric information such as a header, error correction codes, source and destination addresses, and other information required for transmission across the fabric 108, and an encapsulated logic device interface protocol request 504, including a request type command 506, e.g., read or write; a target namespace 508, which may indicate a virtual namespace ID (VNSID) or physical namespace ID (NSID) to which the request 506 is directed; and specific target addresses 510 subject to the read/write request, which may comprise one or more logical block addresses which are subject to the requested read/write operation. The logic device interface protocol request 504 may include additional fields and information to process the request.

The virtual device layer 132 may configure the virtual subsystems 200, virtual controllers 300, and virtual namespaces 400 in the target memory 136 to represent to the attached host nodes 102$_1$ ... 102$_n$.

Figure 6:
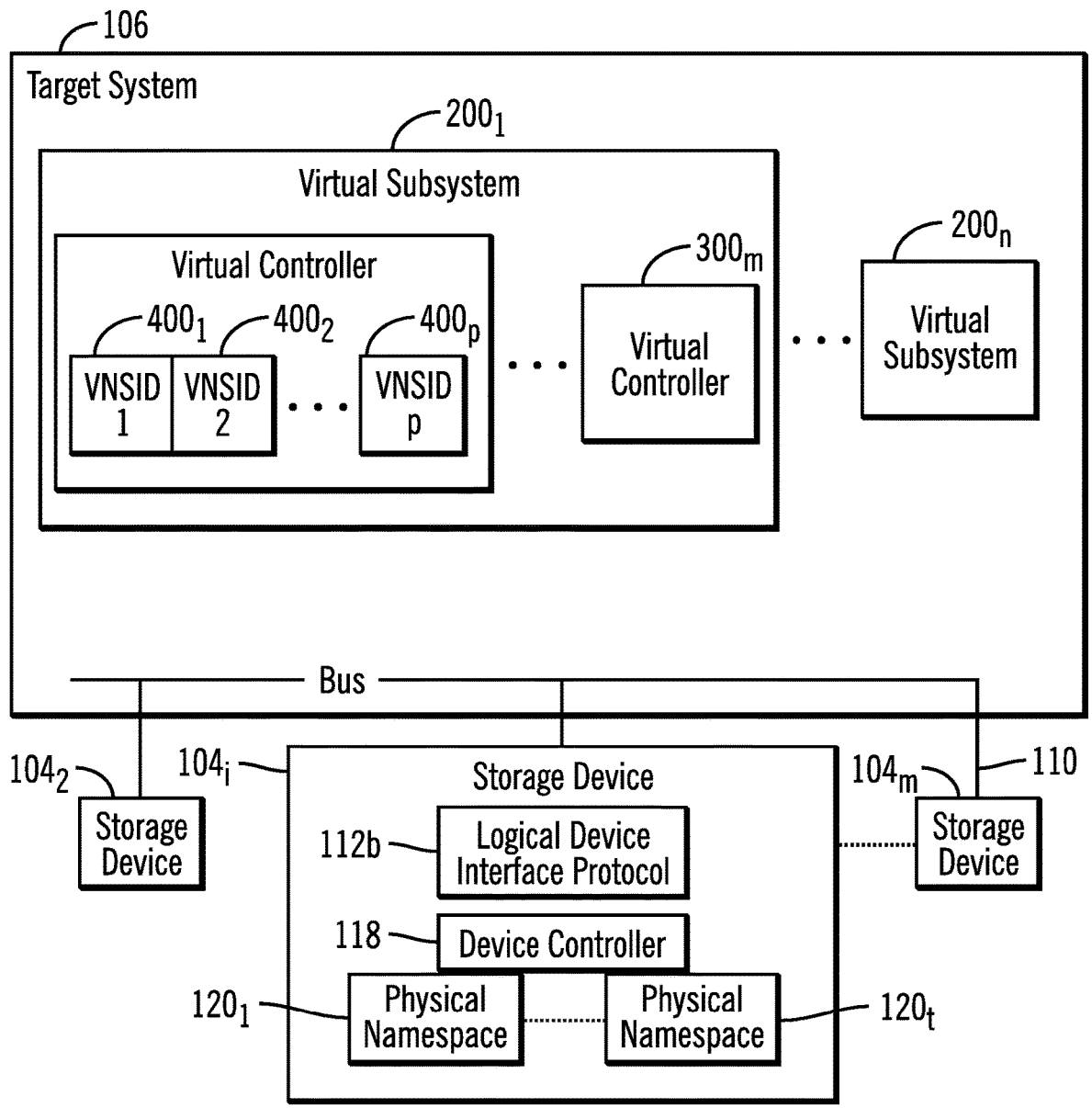
FIGS. 6 and 7 illustrate embodiments of virtual subsystem configurations.

FIG. 6 illustrates an embodiment of a representation of a configuration of virtual subsystems 200$_1$ ... 200$_n$, in the target system 106, where each virtual subsystem 200$_1$ ... 200$_n$ may include, as shown with respect to virtual subsystem 200$_1$, one or more virtual controllers 300$_1$ ... 300$_m$. Each virtual controller 300$_1$ ... 300$_m$, as shown with respect to virtual controller 300$_1$, can include one or more assigned virtual namespace identifiers (VNSID) 400$_1$ ... 400$_p$. Each virtual namespace identifier 400$_1$ ... 400$_p$, maps to one or more physical the namespaces 120$_1$ ... 120$_t$ in the storage devices 104$_1$ ... 104$_m$, including a partition (range of addresses in the namespace) or the entire namespace. Each of the host nodes 102$_1$ ... 102$_n$, are assigned to one or more virtual subsystems 200$_1$ ... 200$_n$, and further to one or more virtual namespace IDs 400$_1$ ... 400$_p$ in the virtual controllers 300$_1$ ... 300$_m$ of the virtual subsystems 200$_1$ ... 200$_n$, to which the host node 102$_i$ is assigned. The host nodes 102$_1$ ... 102$_n$ may access the physical namespace 120$_1$ ... 120$_t$ partitions that map to the virtual namespace IDs 400$_1$ ... 400$_p$ assigned to the hosts, where the host nodes 102$_1$ ... 102$_n$, access the virtual namespace through the virtual controller 300$_i$ to which the VNSID is assigned and virtual subsystem 200$_i$ to which the host node is assigned.

Figure 7:
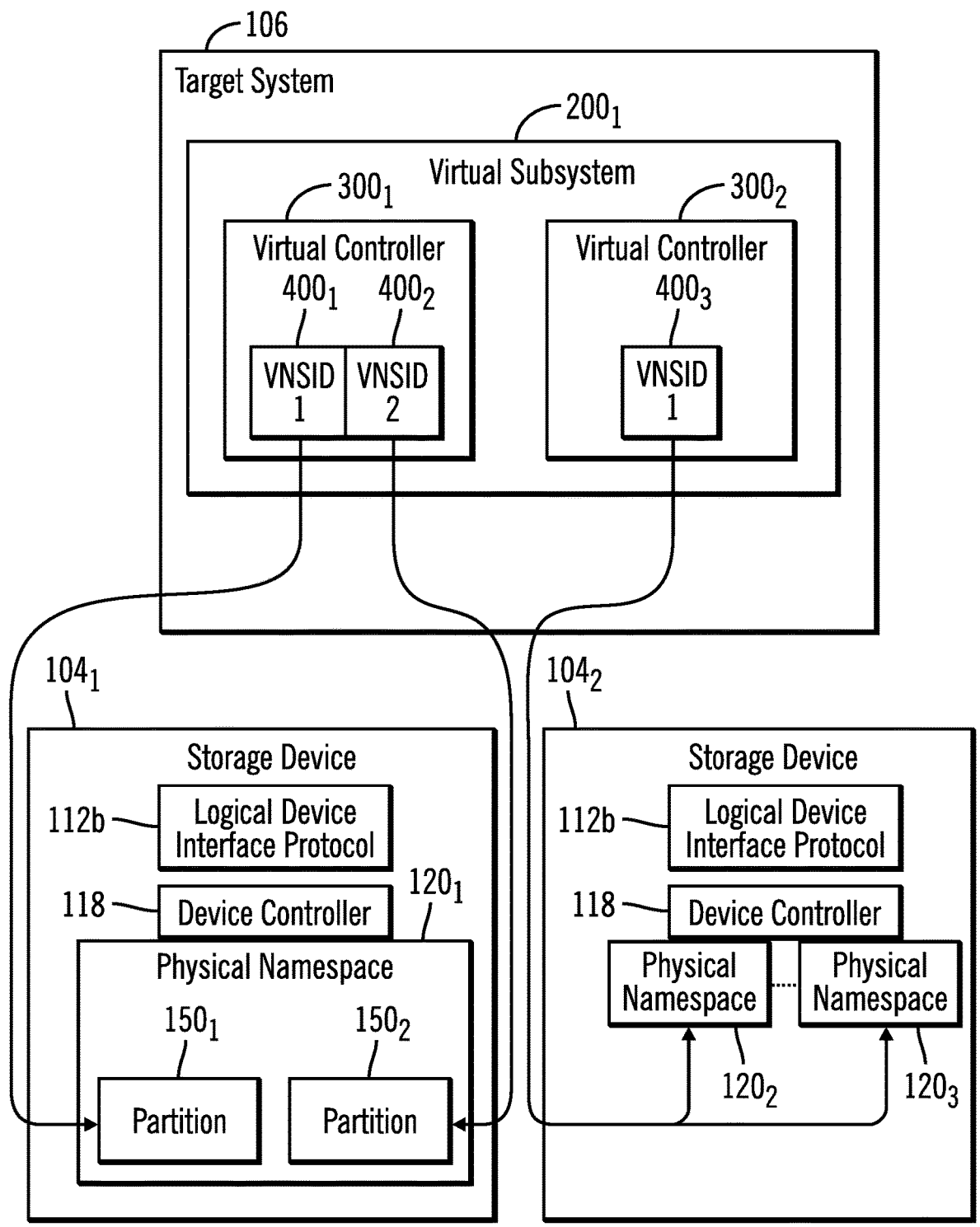

FIG. 7 illustrates a further embodiment of a representation of a configuration of virtual subsystems 200$_1$ having multiple virtual controllers 300$_1$, 300$_2$, each having assigned VNSIDs 400$_1$, 400$_2$ and 400$_3$, respectively. In the configuration of FIG. 7, each of the VNSIDs 400$_1$ and 400$_2$ in the virtual controller 300$i$ maps to different partitions 150$_1$, 150$_2$ of a same physical namespace 120$_1$ in storage device 104$_1$, and the single VNSID 400$_3$ in virtual controller 300$_2$ maps to two different physical namespaces 120$_2$ and 120$_3$ in storage device 104$_2$. In this way, a write to the VNSID 400$_3$ in the second virtual controller 300$_2$ writes to two separate physical namespaces 120$_2$, 120$_3$.

Additional configurations are possible. For instance, the same defined virtual namespace identifier that maps to one physical namespace may be included in two separate virtual controllers to allow for the sharing of a virtual namespace and the mapped physical namespace. Further, one virtual namespace can map to different physical namespaces or different partitions within a namespace in the same or different storage devices. A virtual namespace mapping to a physical namespace/partition may be included in multiple virtual controllers 300$_i$ of one virtual subsystem to allow sharing of the virtual namespace by multiple hosts.

The host nodes 102$_1$ ... 102$_n$ may address a virtual namespace, by including the virtual subsystem (VSS) name, the virtual controller (VC), and the virtual namespace identifier (VNSID) in a combined address, such as VSSname.VCname.VNSID. In this way, virtual namespace IDs in different virtual controllers may have the same number identifier but point to different physical namespaces/partitions. Alternatively, the same virtual namespace IDs in different virtual controllers may point to the same shared physical namespace/partition.

Figure 8:
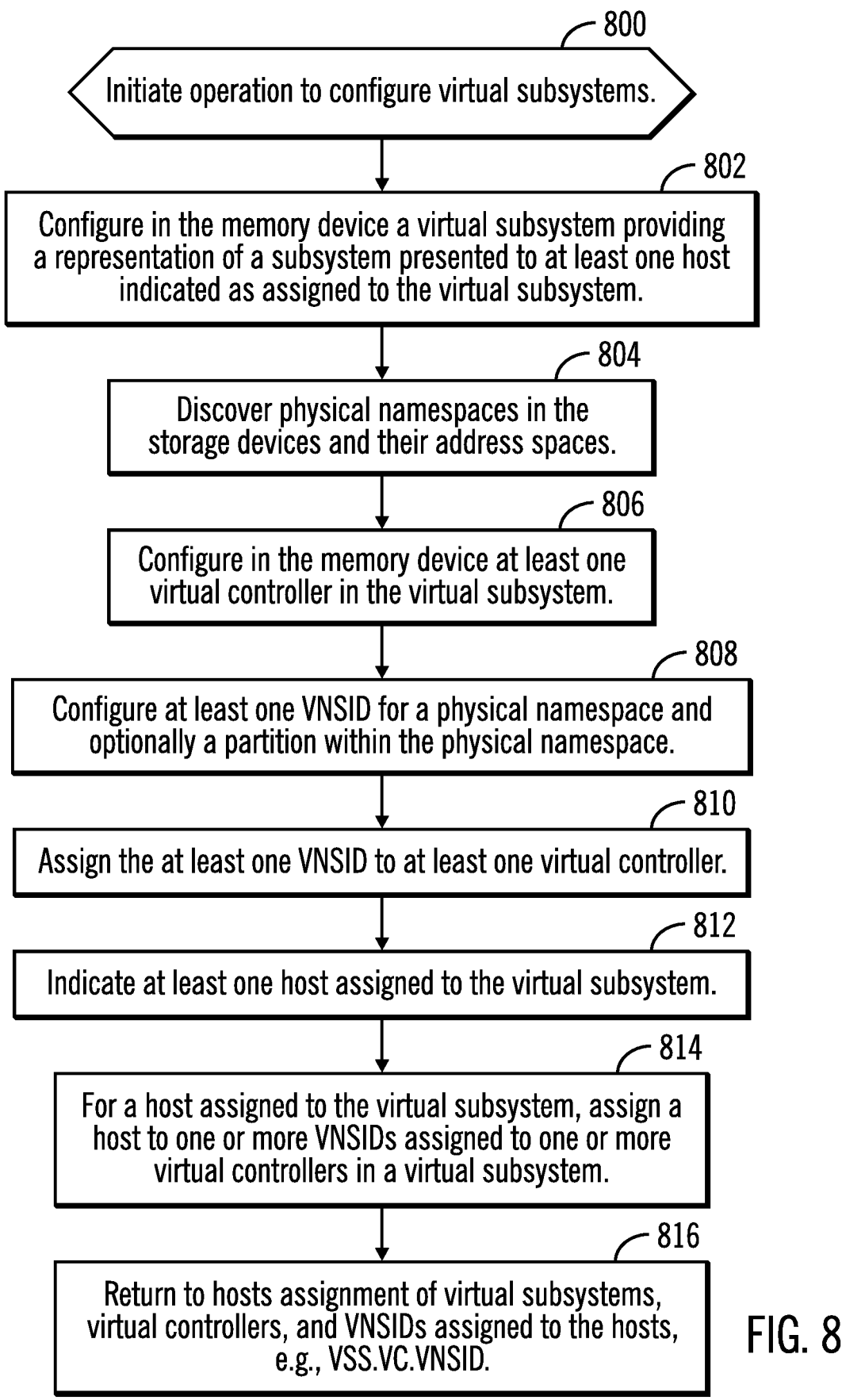
FIG. 8 illustrates an embodiment of operations to generate virtual subsystems, virtual controllers, and virtual namespaces.

FIG. 8 illustrates an embodiment of operations performed by the virtual device layer 132 to generate the virtual subsystem 200, virtual controller 300, and virtual namespace 400 definitions. The virtual device layer 132 may generate the virtual definitions 200, 300, 400 in response to commands via a script program or a user interface to create these resources. In further embodiments, the virtual device layer 132 may generate the virtual definitions 200, 300, 400 in response to bits being set in a hardware register address space in the target system 106 or in hardware components implementing the virtual device layer 132 or in settings configured in the memory 136. Upon initiating (at block 800) an operation to configure virtual subsystems 200$_1$ ... 200$_n$, the virtual device layer 132 configures (at block 802) in the memory device 136 a virtual subsystem 200$_i$ providing a representation of a subsystem presented to at least one host node 102$_1$ ... 102$_n$ indicated in assigned hosts 204 as assigned to the virtual subsystem 200$_i$. The virtual device layer 132 discovers (at block 804) physical namespaces 120$_1$ ... 120$_t$ in the storage devices 104$_1$ ... 104$_m$ and their address spaces. At least one virtual controller 300$_i$ is configured (at block 806) in the memory 136 and indicated in one virtual subsystem definition 200$_i$. The virtual device layer 132 configures (at block 808) at least one virtual namespace 400$_i$ for a physical namespace 120$_1$ ... 120$_t$ and optionally a partition within the discovered physical namespace 120$_1$ ... 120$_t$ or the entire physical namespace. At least one of the virtual namespaces is indicated as assigned (at block 810) to at least one virtual controller 300$_i$ by indicating the virtual namespace identifier (VNSID) 400$_i$ in the virtual controller definition 300$_i$. The virtual device layer 132 further indicates (at block 812) at least one host node 102$_1$ ... 102$_n$, as assigned, such as in field, 204 of the virtual subsystem definition 200$_i$, to one of the virtual subsystem 200$_i$. For a host node 102$_1$ ... 102$_n$ assigned to the virtual subsystem 200$_i$, the virtual device layer 132 assigns (at block 814) a host 102$_j$ to one or more virtual namespaces 400$_i$ assigned to one or more virtual controllers 300$_i$ in a virtual subsystem 200$_i$, such as by indicating the host 102$_j$ in the assigned host 404 field of the virtual namespace definition 400$_i$ to which the host 102$_j$ is assigned. Once assigned (at block 814), the host 102$_j$ may submit logical device interface protocol requests 504 to the virtual namespace identifier to access the assigned one or more physical namespace/partitions 406$_i$ in the storage device 408$_i$.

With the operations of FIG. 8, the virtual device layer 132 constructs virtual representations in the memory 136 of the target system 106 of subsystems, controllers, and namespaces that are presented to the host nodes 102$_1$ ...

$102_n$ to access physical namespaces $120_1 \ldots 120_r$ in the storage devices $104_1 \ldots 104_m$.

Figure 9A:
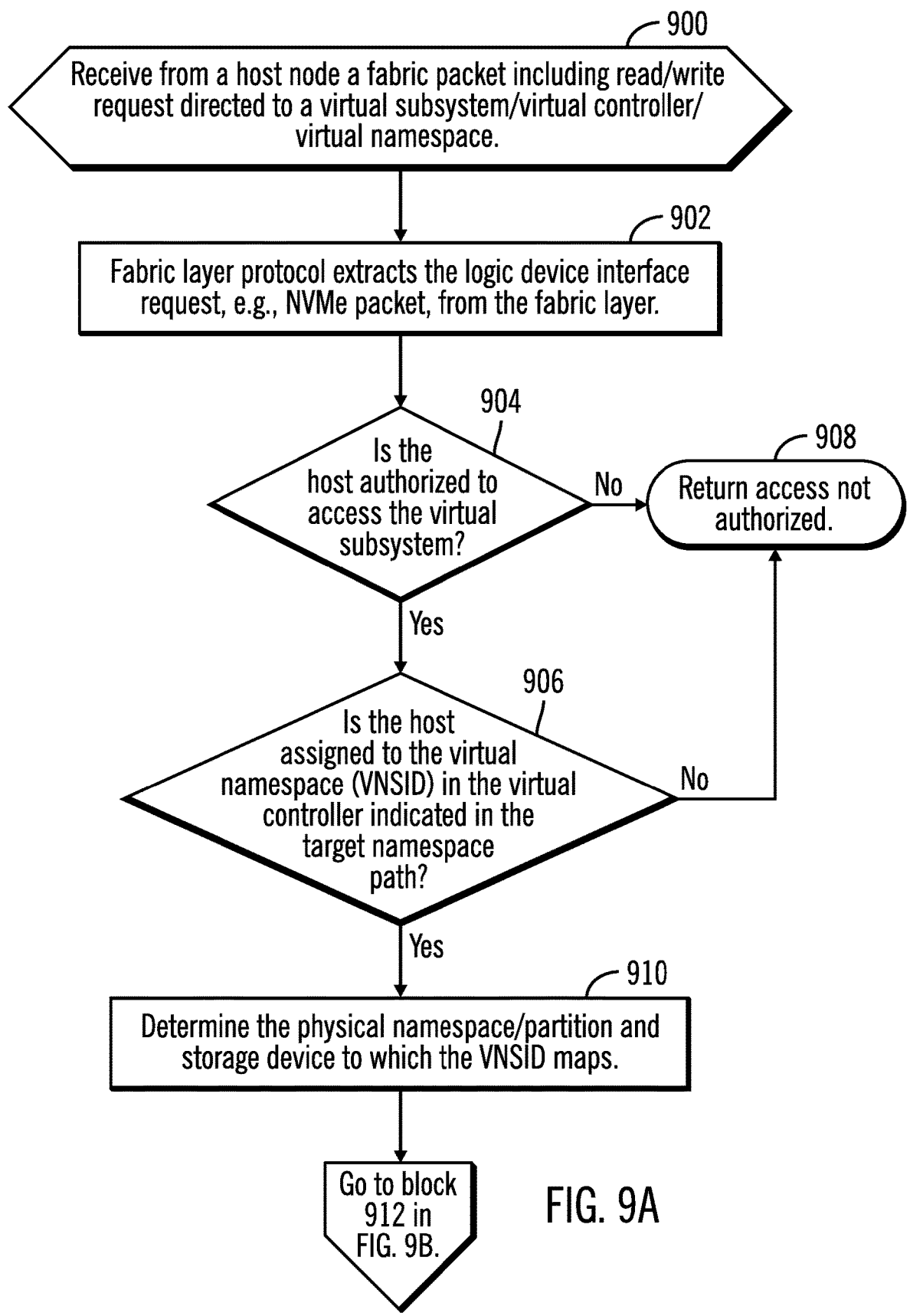
FIGS. 9*a* and 9*b* illustrate an embodiment of operations to process a read/write request directed to a virtual namespace.
Figure 9B:
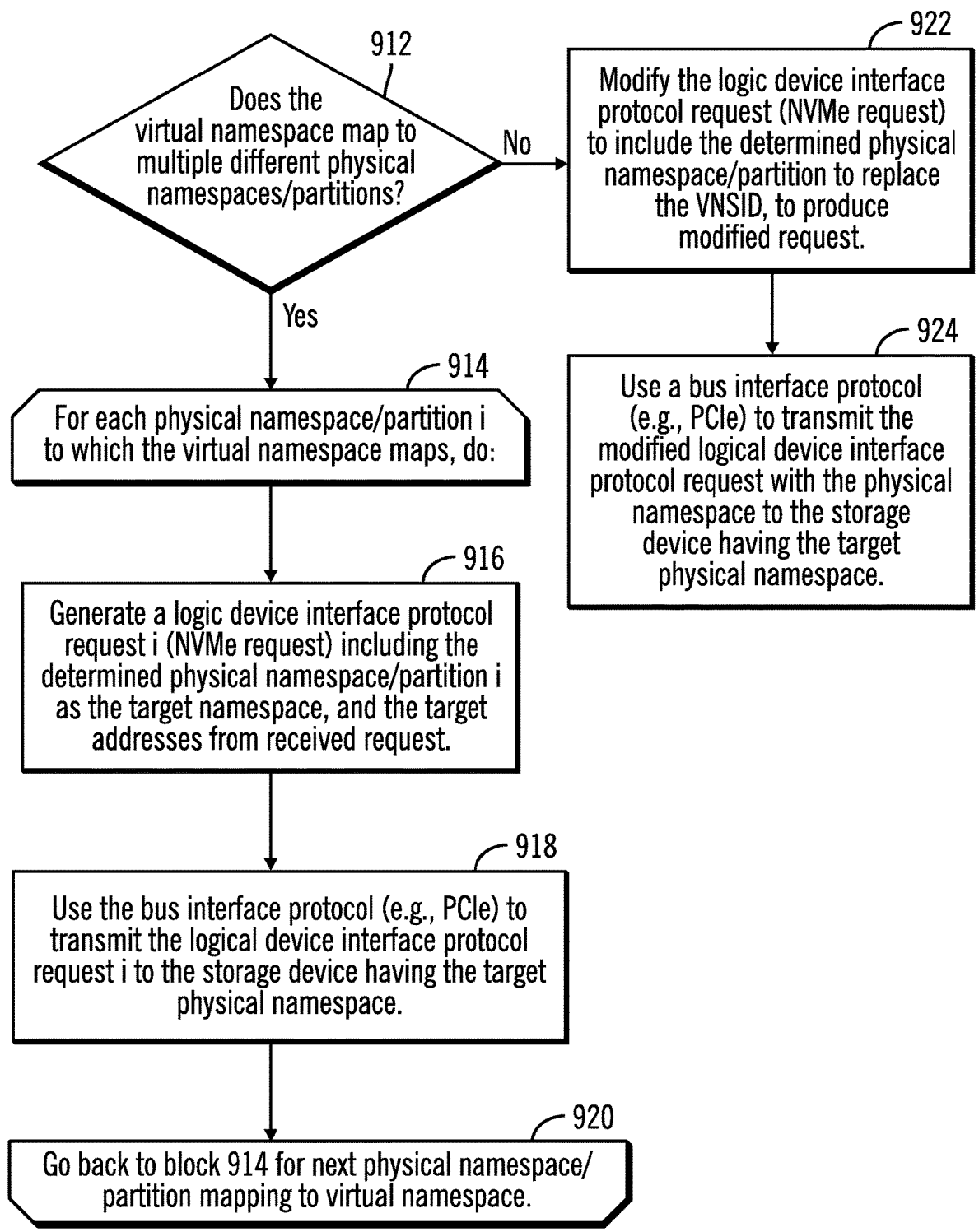

FIGS. 9a and 9b illustrate an embodiment of operations performed by the virtual device layer 132 and other components of the target system 106, such as the fabric layer protocols 124 and bus interface protocol 138, to process a fabric packet 500 having a logic device interface protocol request 504, e.g., NVMe request, directed to a virtual namespace identifier (VNSID) 508. Upon receiving (at block 900) from a host node $102_i$ a fabric packet 500 including a read/write request 506 directed to a virtual namespace, e.g., VSSname.VCname.VNSID, a specific fabric protocol 126, 128, 130 in the fabric layer protocols 124 extracts (at block 902) the logic device interface protocol request 504, e.g., NVMe packet, from the fabric layer 502 of the fabric packet 500. If (at block 904) the host $102_i$ initiating the request, which may be indicated in the fabric layer 502 or request 504, is authorized to access the virtual subsystem $200_i$ specified in the target namespace 508 of the request, such as the host $102_i$ is indicated in the assigned hosts 204 of the virtual subsystem definition $200_i$ identified in the request, such as in the path of the target namespace 508, then a determination is made (at block 906) as to whether the requesting host $102_i$ is assigned to the requested virtual namespace (VNSID), such as indicated in host assigned field 404 of the requested virtual namespace $400_i$ in the virtual controller $300_i$, which may be indicated in the target namespace request path 508. If (at block 904) the host $102_i$ does not have access to the requested virtual subsystem $200_i$ or does not have access to the requested virtual namespace $400_i$ in the target namespace path 508, then the request is denied and an access not authorized message is returned (at block 908) to the requesting host $102_i$.

If (at block 904 and 906) the requesting host $102_i$ is authorized to access the virtual subsystem $200_i$ and the virtual namespace $400_i$ in the target namespace path 508, respectively, then the virtual device layer 132 determines (at block 910) the one or more physical namespaces $120_1 \ldots 120_r$/partitions $406_i$ to which the requested virtual namespace $400_i$ maps, as indicated in the virtual namespace definition $400_i$. Control then proceeds to FIG. 9b where the virtual device layer 132 determines (at block 912) whether the target virtual namespace 508 maps to multiple different physical namespaces/partitions $406_1 \ldots 406_p$. If so, then the virtual device layer 132 performs the loop of operations at blocks 914-920 for each physical namespace/partition i of the multiple physical namespace/partitions $406_i \ldots 406_p$ to which the target virtual namespace maps The virtual device layer 132 generates (at block 916) a logic device interface protocol request 504 (NVMe request) including the determined physical namespace/partition $406_i$ as the target namespace 508, and the target addresses 510 from received the request 504 subject to the write request. The virtual device layer 132 uses (at block 918) a bus interface protocol 138 (e.g., PCIe) to transmit the logical device interface protocol request 504 to the storage device $408_i$ having the target physical namespace/partition $406_i$.

If (at block 912) the target virtual namespace 508 maps to only one target physical namespace/partition $406_1$, then the virtual device layer 132 modifies (at block 922) the logic device interface protocol request 504 (e.g., NVMe request) to include the determined physical namespace/partition $406_i$ as the target namespace 508 to replace the target virtual namespace inserted by the host node to produce a modified logical device interface protocol request 504, which is then transmitted (at block 924) using the bus interface protocol 138 to the storage device $104_i$ indicated in field $408_1$ of the virtual namespace definition $400_i$ for the target VNSID.

With the described embodiments, a single logical device interface protocol request is transferred from the host system, over a fabric, to a target system, where the target virtual namespace in the request is replaced with the physical namespace to which the virtual namespace maps. This modified logical device interface protocol request is then transmitted to the storage device having the target namespace in the request using a bus protocol. With the described embodiments, the request does not need to be converted from one format to another, as the same request logical device protocol is used in the transmitted request. This is accomplished by generating virtual subsystems, virtual controllers, and virtual namespaces to present to the host nodes to communicate with the connected storage devices.

The described operations of the processing components, such as components 112a, 112b, 112c, 114, 124, 132, 138, and other components, may be implemented as a method, apparatus, device, computer product comprising a computer readable storage medium using standard programming and/or engineering techniques to produce software, firmware, hardware, or any combination thereof. The described operations may be implemented as code or logic maintained in a "computer readable storage medium". The term "code" as used herein refers to software program code, hardware logic, firmware, microcode, etc. The computer readable storage medium, as that term is used herein, includes a tangible element, including at least one of electronic circuitry, storage materials, inorganic materials, organic materials, biological materials, a casing, a housing, a coating, and hardware. A computer readable storage medium may comprise, but is not limited to, a magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), computer encoded and readable punch cards, etc. The computer readable storage medium may further comprise a hardware device implementing firmware, microcode, etc., such as in an integrated circuit chip, a programmable logic device, a Programmable Gate Array (PGA), field-programmable gate array (FPGA), Application Specific Integrated Circuit (ASIC), etc. Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmission signals, but includes physical and tangible components. Those skilled in the art will recognize that many modifications may be made to this configuration without departing from the scope of the present invention, and that the article of manufacture may comprise suitable information bearing medium known in the art.

Figure 10:
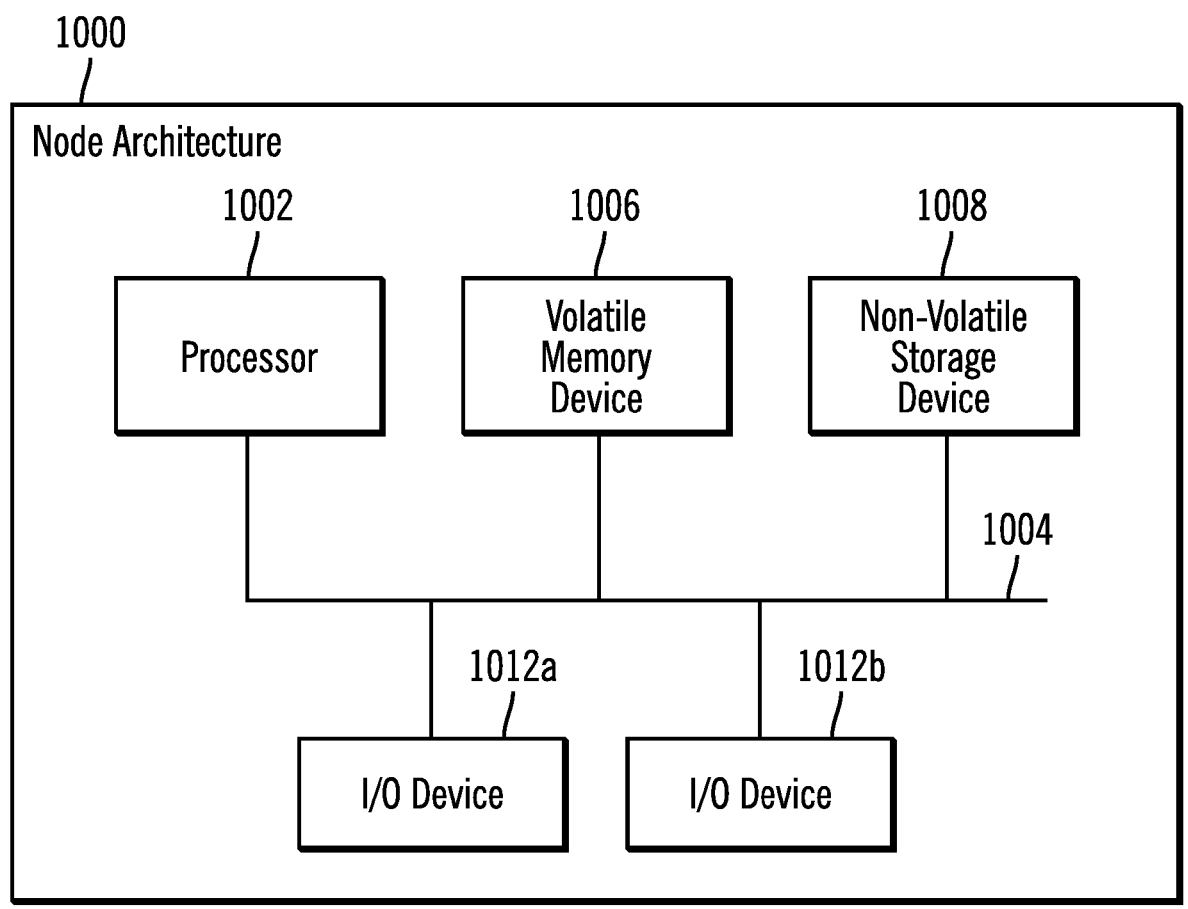
FIG. 10 illustrates an embodiment of a computer node architecture in which components may be implemented

FIG. 10 illustrates an embodiment of a computer node architecture 1000, such as the components included in the host nodes $102_1, 102_2 \ldots 102_n$ and the target system 106, including a processor 1002 that communicates over a bus 1004 with a volatile memory device 1006 in which programs, operands and parameters being executed are cached, and a non-volatile storage device 1004, such as target system memory 136. The bus 1004 may comprise multiple buses. Further, the bus 1004 may comprise a multi-agent bus or not be a multi-agent bus, and instead provide point-to-point connections according to PCIe architecture. The processor 1002 may also communicate with Input/output (I/O) devices 1012a, 1012b, which may comprise input devices, display devices, graphics cards, ports, network interfaces, etc. For the host nodes $102_1$, $102_2$ . . . $102_n$, the virtual subsystems may also appear on the bus 1004 as bus components.

In certain embodiments, the computer node architecture 1000 may comprise a personal computer, server, mobile device or embedded compute device. In a silicon-on-chip (SOC) implementation, the architecture 1000 may be implemented in an integrated circuit die. In certain implementations, the architecture 1000 may not include a PCIe bus to connect to NVMe storage devices, and instead include a network adaptor to connect to a fabric or network and send communications using the NVMe interface to communicate with the target system 106 to access underlying storage devices $104_1$ . . . $104_m$.

The reference characters used herein, such as i, j, m, n, p, and t are used to denote a variable number of instances of an element, which may represent the same or different values, and may represent the same or different value when used with different or the same elements in different described instances.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

EXAMPLES

Example 1 is a computer product including a computer readable storage media deployed in a target system, wherein the target system includes a memory device and communicates with at least one host system and at least one storage device, wherein the computer readable storage media includes code that is executed to: configure, in the memory device, a virtual subsystem to provide a representation of a subsystem presented to the at least one host system, wherein the at least one host system is to communicate with the virtual subsystem to access the at least one storage device; and configure, in the memory device, at least one virtual namespace for the virtual subsystem, wherein each of the at least one virtual namespace maps to at least one physical namespace in at least one storage device, wherein each virtual namespace is assigned to one host system to use to direct read and write requests to the at least one physical namespace of the at least one storage device assigned to the virtual namespace.

In Example 2, the subject matter of Examples 1 and 3-11 can optionally include that one virtual namespace maps to at least two physical namespaces in at least one of the storage devices.

In Example 3, the subject matter of Examples 1, 2 and 4-11 can optionally include that at least two virtual namespaces map to different ranges of addresses within one physical namespace in one of the at least one storage device.

In Example 4, the subject matter of Examples 1-3 and 5-11 can optionally include that two virtual namespaces in the at least one storage device are assigned to different host systems.

In Example 5, the subject matter of Examples 1-4 and 6-11 can optionally include that the code is further executed to: configure, in the memory device, at least one virtual controller in the virtual subsystem, wherein each of the at least one virtual controller is assigned at least virtual namespace.

In Example 6, the subject matter of Examples 1-5 and 7-11 can optionally include that one virtual controller is assigned a first virtual namespace assigned to a first host system and a second virtual namespace assigned to a second host system, wherein the first and second virtual namespaces map to first and second ranges of addresses, respectively, in one of the storage devices.

In Example 7, the subject matter of Examples 1-6 and 8-11 can optionally include that at least two of the virtual controllers are assigned a same virtual namespace assigned to one physical namespace to provide shared access to the physical namespace assigned to the virtual namespace.

In Example 8, the subject matter of Examples 1-7 and 9-11 can optionally include that the code is further executed to: receive from the host system a read or write request directed to a target virtual namespace; determine the physical namespace and a storage device including the physical namespace to which the target virtual namespace maps; and send to the determined storage device the received read or write request directed to the determined physical namespace.

In Example 9, the subject matter of Examples 1-8 and 10-11 can optionally include that the code is further executed to: receive from the host system a read or write request directed to a target virtual namespace that maps to a plurality of physical namespaces; and send the received read or write request directed to at least one storage device having the plurality of physical namespaces to which the target virtual namespace maps.

In Example 10, the subject matter of Examples 1-9 and 11 can optionally include that the target system, the at least one host system, and the at least one storage device implement a logical device interface protocol to communicate read and write requests between the at least one host system and the at least one storage device, wherein the target system communicates with the at least one host system using a fabric protocol and wherein the targets system and the at least one storage device communicate using a bus interface protocol, wherein the code is further executed to: receive from the host system a packet in the fabric protocol encapsulating a read or write request in the logical device interface protocol directed to a target virtual namespace; determine the physical namespace and the storage device including the physical namespace to which the target virtual namespace maps; generate a modified read or write request in the logical device interface protocol directed to the determined physical namespace to perform the received read or write request; and send to the determined storage device, using the bus interface protocol, the modified read or write request directed to the determined physical namespace.

In Example 11, the subject matter of Examples 1-10 can optionally include that the logical device interface protocol comprises a Non-volatile Memory Express (NVMe) protocol and wherein the bus interface protocol comprises a Peripheral Component Interconnect Express (PCIe) protocol.

Example 12 is a system for dynamically managing at least one storage device accessed by at least one host system over a network, comprising: a processor to process received read and write requests directed to the at least one storage device; a memory device; a computer readable storage medium including code that is executed by the processor to: configure, in the memory device, a virtual subsystem to provide a representation of a subsystem presented to the at least one host system, wherein the at least one host system is to communicate with the virtual subsystem to access the at least one storage device; and configure, in the memory device, at least one virtual namespace for the virtual subsystem, wherein each of the at least one virtual namespace maps to at least one physical namespace in at least one storage device, wherein each virtual namespace is assigned to one host system to use to direct read and write requests to the at least one physical namespace of the at least one storage device assigned to the virtual namespace.

In Example 13, the subject matter of Examples 12 and 14-18 can optionally include that one virtual namespace maps to at least two physical namespaces in at least one of the storage devices.

In Example 14, the subject matter of Examples 12, 13 and 15-18 can optionally include that the code is further executed to: configure, in the memory device, at least one virtual controller in the virtual subsystem, wherein each of the at least one virtual controller is assigned at least virtual namespace.

In Example 15, the subject matter of Examples 12-14 and 16-18 can optionally include that one virtual controller is assigned a first virtual namespace assigned to a first host system and a second virtual namespace assigned to a second host system, wherein the first and second virtual namespaces map to first and second ranges of addresses, respectively, in one of the storage devices.

In Example 16, the subject matter of Examples 12-15, 17, and 18 can optionally include that the code is further executed to: receive from the host system a read or write request directed to a target virtual namespace; determine the physical namespace and a storage device including the physical namespace to which the target virtual namespace maps; and send to the determined storage device the received read or write request directed to the determined physical namespace.

In Example 17, the subject matter of Examples 12-16 and 18 can optionally include that the code is further executed to: receive from the host system a read or write request directed to a target virtual namespace that maps to a plurality of physical namespaces; and send the received read or write request directed to at least one storage device having the plurality of physical namespaces to which the target virtual namespace maps.

In Example 18, the subject matter of Examples 12-17 can optionally include that the target system, the at least one host system, and the at least one storage device implement a logical device interface protocol to communicate read and write requests between the at least one host system and the at least one storage device, wherein the target system communicates with the at least one host system using a fabric protocol and wherein the targets system and the at least one storage device communicate using a bus interface protocol, wherein the code is further executed to: receive from the host system a packet in the fabric protocol encapsulating a read or write request in the logical device interface protocol directed to a target virtual namespace; determine the physical namespace and the storage device including the physical namespace to which the target virtual namespace maps; generate a modified read or write request in the logical device interface protocol directed to the determined physical namespace to perform the received read or write request; and send to the determined storage device, using the bus interface protocol, the modified read or write request directed to the determined physical namespace.

Example 19 is a method for dynamically managing at least one storage device accessed by at least one host system over a network, comprising: configuring, in a memory device, a virtual subsystem to provide a representation of a subsystem presented to at least one host system, wherein the at least one host system is to communicate with the virtual subsystem to access at least one storage device; and configuring, in the memory device, at least one virtual namespace for the virtual subsystem, wherein each of the at least one virtual namespace maps to at least one physical namespace in at least one storage device, wherein each virtual namespace is assigned to one host system to use to direct read and write requests to the at least one physical namespace of the at least one storage device assigned to the virtual namespace.

In Example 20, the subject matter of Examples 19 and 21-25 can optionally include that one virtual namespace maps to at least two physical namespaces in at least one of the storage devices.

In Example 21, the subject matter of Examples 19, 20 and 22-25 can optionally include configuring, in the memory device, at least one virtual controller in the virtual subsystem, wherein each of the at least one virtual controller is assigned at least virtual namespace.

In Example 22, the subject matter of Examples 19-21 and 23-25 can optionally include that one virtual controller is assigned a first virtual namespace assigned to a first host system and a second virtual namespace assigned to a second host system, wherein the first and second virtual namespaces map to first and second ranges of addresses, respectively, in one of the storage devices.

In Example 23, the subject matter of Examples 19-22 and 24-25 can optionally include receiving from the host system a read or write request directed to a target virtual namespace; determining the physical namespace and a storage device including the physical namespace to which the target virtual namespace maps; and sending to the determined storage device the received read or write request directed to the determined physical namespace.

In Example 24, the subject matter of Examples 19-23 and 25 can optionally include receiving from the host system a read or write request directed to a target virtual namespace that maps to a plurality of physical namespaces; and sending the received read or write request directed to at least one storage device having the plurality of physical namespaces to which the target virtual namespace maps.

In Example 25, the subject matter of Examples 19-24 can optionally include that the target system, the at least one host system, and the at least one storage device implement a logical device interface protocol to communicate read and write requests between the at least one host system and the at least one storage device, wherein the target system communicates with the at least one host system using a fabric protocol and wherein the targets system and the at least one storage device communicate using a bus interface protocol, further comprising: receiving from the host system a packet in the fabric protocol encapsulating a read or write request in the logical device interface protocol directed to a target virtual namespace; determining the physical namespace and the storage device including the physical namespace to which the target virtual namespace maps; generating a modified read or write request in the logical device interface protocol directed to the determined physical namespace to perform the received read or write request; and sending to the determined storage device, using the bus interface protocol, the modified read or write request directed to the determined physical namespace.

In Example 26, the subject matter of Examples 19 can optionally include the at least any one of:

(1) wherein one virtual namespace maps to at least two physical namespaces in at least one of the storage devices; and/or (2) wherein at least two virtual namespaces map to different ranges of addresses within one physical namespace in one of the at least one storage device; and/or (3) wherein two virtual namespaces in the at least one storage device are assigned to different host systems; and/or (4) configuring, in the memory device, at least one virtual controller in the virtual subsystem, wherein each of the at least one virtual controller is assigned at least virtual namespace; and/or (5) wherein one virtual controller is assigned a first virtual namespace assigned to a first host system and a second virtual namespace assigned to a second host system, wherein the first and second virtual namespaces map to first and second ranges of addresses, respectively, in one of the storage devices; and/or.

(6) wherein at least two of the virtual controllers are assigned a same virtual namespace assigned to one physical namespace to provide shared access to the physical namespace assigned to the virtual namespace; and/or (7) receiving from the host system a read or write request directed to a target virtual namespace; determining the physical namespace and a storage device including the physical namespace to which the target virtual namespace maps; and sending to the determined storage device the received read or write request directed to the determined physical namespace; and/or (8) receiving from the host system a read or write request directed to a target virtual namespace that maps to a plurality of physical namespaces; and sending the received read or write request directed to at least one storage device having the plurality of physical namespaces to which the target virtual namespace maps; and/or (9) wherein the target system, the at least one host system, and the at least one storage device implement a logical device interface protocol to communicate read and write requests between the at least one host system and the at least one storage device, wherein the target system communicates with the at least one host system using a fabric protocol and wherein the targets system and the at least one storage device communicate using a bus interface protocol, further comprising: receiving from the host system a packet in the fabric protocol encapsulating a read or write request in the logical device interface protocol directed to a target virtual namespace; determining the physical namespace and the storage device including the physical namespace to which the target virtual namespace maps; generating a modified read or write request in the logical device interface protocol directed to the determined physical namespace to perform the received read or write request; and sending to the determined storage device, using the bus interface protocol, the modified read or write request directed to the determined physical namespace; and/or

(10) wherein the logical device interface protocol comprises a Non-volatile Memory Express (NVMe) protocol and wherein the bus interface protocol comprises a Peripheral Component Interconnect Express (PCIe) protocol.

Example 27 is an apparatus for dynamically managing at least one storage device accessed by at least one host system over a network, having computer program code executed to: configure, in the memory device, a virtual subsystem to provide a representation of a subsystem presented to the at least one host system, wherein the at least one host system is to communicate with the virtual subsystem to access the at least one storage device; and configure, in the memory device, at least one virtual namespace for the virtual subsystem, wherein each of the at least one virtual namespace maps to at least one physical namespace in at least one storage device, wherein each virtual namespace is assigned to one host system to use to direct read and write requests to the at least one physical namespace of the at least one storage device assigned to the virtual namespace.

In Example 28, the subject matter of Examples 27 and 29-37 can optionally include that one virtual namespace maps to at least two physical namespaces in at least one of the storage devices.

In Example 29, the subject matter of Examples 27, 28 and 30-37 can optionally include that at least two virtual namespaces map to different ranges of addresses within one physical namespace in one of the at least one storage device.

In Example 30, the subject matter of Examples 27-29 and 31-37 can optionally include that two virtual namespaces in the at least one storage device are assigned to different host systems.

In Example 31, the subject matter of Examples 27-30 and 32-37 can optionally include configure, in the memory device, at least one virtual controller in the virtual subsystem, wherein each of the at least one virtual controller is assigned at least virtual namespace.

In Example 32, the subject matter of Examples 27-31 and 33-37 can optionally include that one virtual controller is assigned a first virtual namespace assigned to a first host system and a second virtual namespace assigned to a second host system, wherein the first and second virtual namespaces map to first and second ranges of addresses, respectively, in one of the storage devices.

In Example 33, the subject matter of Examples 27-32 and 34-36 can optionally include that at least two of the virtual controllers are assigned a same virtual namespace assigned to one physical namespace to provide shared access to the physical namespace assigned to the virtual namespace.

In Example 34, the subject matter of Examples 27-34 and 35-36 can optionally receive from the host system a read or write request directed to a target virtual namespace; determine the physical namespace and a storage device including the physical namespace to which the target virtual namespace maps; and send to the determined storage device the received read or write request directed to the determined physical namespace.

In Example 35, the subject matter of Examples 27-34 and 36-37 can optionally include receive from the host system a read or write request directed to a target virtual namespace that maps to a plurality of physical namespaces; and send the received read or write request directed to at least one storage device having the plurality of physical namespaces to which the target virtual namespace maps.

In Example 36, the subject matter of Examples 27-35 and 37 can optionally include that the target system, the at least one host system, and the at least one storage device implement a logical device interface protocol to communicate read and write requests between the at least one host system and the at least one storage device, wherein the target system communicates with the at least one host system using a fabric protocol and wherein the targets system and the at least one storage device communicate using a bus interface protocol, wherein the code is further executed to: receive from the host system a packet in the fabric protocol encapsulating a read or write request in the logical device interface protocol directed to a target virtual namespace; determine the physical namespace and the storage device including the physical namespace to which the target virtual namespace maps; generate a modified read or write request in the logical device interface protocol directed to the determined physical namespace to perform the received read or write request; and send to the determined storage device, using the bus interface protocol, the modified read or write request directed to the determined physical namespace.

In Example 37, the subject matter of Examples 27-35 can optionally include that the logical device interface protocol comprises a Non-volatile Memory Express (NVMe) protocol and wherein the bus interface protocol comprises a Peripheral Component Interconnect Express (PCIe) protocol.

Example 38 is an apparatus for dynamically managing at least one storage device accessed by at least one host system over a network, comprising: means for configuring, in a memory device, a virtual subsystem to provide a representation of a subsystem presented to at least one host system, wherein the at least one host system is to communicate with the virtual subsystem to access at least one storage device; and means for configuring, in the memory device, at least one virtual namespace for the virtual subsystem, wherein each of the at least one virtual namespace maps to at least one physical namespace in at least one storage device, wherein each virtual namespace is assigned to one host system to use to direct read and write requests to the at least one physical namespace of the at least one storage device assigned to the virtual namespace.

Example 39 is an apparatus comprising means to perform a method as claimed in any preceding claim.

Example 40 is a machine-readable storage including machine-readable instructions, when executed, to implement a method or realize an apparatus as claimed in any preceding claim.

What is claimed:

1. A computer readable storage media comprising a plurality of instructions that in response to being executed by a computer system, cause the computer system to:
    configure, in a memory device, a virtual subsystem to provide at least one host system access to at least one storage device coupled with the computer system;
    configure, in the memory device, at least one virtual namespace for the virtual subsystem, the at least one virtual namespace assigned to a plurality of physical namespaces including logical blocks configured in a plurality of physical storage devices coupled with the computer system, each physical namespace to include logical blocks configured in a quantity of physical storage included in the at least one storage device; and
    assign at least one host system to the at least one virtual namespace, wherein the at least one virtual namespace indicates at least one physical namespace and at least one storage device including the at least one physical namespace to which the at least one virtual namespace is assigned, and the at least one host system to direct read and write requests to the at least one physical namespace of the at least one storage device assigned to the at least one virtual namespace.

2. The computer readable storage media of claim 1, wherein the at least one virtual namespace indicates at least two physical namespaces in the at least one storage device.

3. The computer readable storage media of claim 1, wherein the at least one virtual namespace comprises two virtual namespaces, the two virtual namespaces assigned to different ranges of addresses within one physical namespace in one of the at least one storage device.

4. The computer readable storage media of claim 3, wherein the two virtual namespaces in the at least one storage device are assigned to different host systems from among the at least one host system.

5. The computer readable storage media of claim 4, wherein the instructions further cause the computer system to:
    configure, in the memory device, at least one virtual controller in the virtual subsystem, wherein each of the at least one virtual controller is assigned at least one virtual namespace.

6. The computer readable storage media of claim 5, wherein one virtual controller is assigned a first virtual namespace assigned to a first host system and a second virtual namespace assigned to a second host system, wherein first and second virtual namespaces map to first and second ranges of addresses, respectively, in one of the at least one storage device.

7. The computer readable storage media of claim 5, wherein at least two virtual controllers are assigned a same virtual namespace assigned to one physical namespace to provide shared access to the physical namespace.

8. The computer readable storage media of claim 1, wherein the instructions further cause the computer system to:
receive from the at least one host system a read or write request directed to a target virtual namespace;
determine a physical namespace and a storage device including the determined physical namespace to which the target virtual namespace maps; and
send to the determined storage device the received read or write request directed to the determined physical namespace.

9. The compute readable storage media of claim 1, wherein a target system, the at least one host system, and the at least one storage device implement a logical device interface protocol to communicate read and write requests between the at least one host system and the at least one storage device, wherein the target system communicates with the at least one host system using a fabric protocol and wherein the targets system and the at least one storage device communicate using a bus interface protocol, wherein the instructions further cause the computer system to:
receive from the at least one host system a packet in the fabric protocol encapsulating a read or write request in the logical device interface protocol directed to a target virtual namespace;
determine a physical namespace and storage device including the physical namespace to which the target virtual namespace maps;
generate a modified read or write request in the logical device interface protocol directed to the determined physical namespace to perform the received read or write request; and
send to the determined storage device, using the bus interface protocol, the modified read or write request directed to the determined physical namespace.

10. The compute readable storage media of claim 9, wherein the logical device interface protocol comprises a Non-volatile Memory Express (NVMe) protocol and wherein the bus interface protocol comprises a Peripheral Component Interconnect Express (PCIe) protocol.

11. A system comprising:
a processor to process received read and write requests directed to at least one storage device;
a memory device; and
a computer readable storage medium including code that is executed by the processor to:
configure, in the memory device, a virtual subsystem to provide at least one host system access to at least one storage device coupled with a computer system;
configure, in the memory device, at least one virtual namespace for the virtual subsystem, the at least one virtual namespace assigned to a plurality of physical namespaces including logical blocks configured in a plurality of physical storage devices coupled with the computer system, each physical namespace to include logical blocks configured in a quantity of physical storage included in the at least one storage device;
and
assign at least one host system to the at least one virtual namespace, wherein the at least one virtual namespace indicates at least one physical namespace and at least one storage device including the at least one physical namespace to which the at least one virtual namespace is assigned, and the at least one host system to direct read and write requests to the at least one physical namespace of the at least one storage device assigned to the at least one virtual namespace.

12. The system of claim 11, wherein the at least one virtual namespace indicates at least two physical namespaces in the at least one storage device.

13. The system of claim 11, wherein a target system, the at least one host system, and the at least one storage device implement a logical device interface protocol to communicate read and write requests between the at least one host system and the at least one storage device, wherein the target system communicates with the at least one host system using a fabric protocol and wherein the targets system and the at least one storage device communicate using a bus interface protocol, wherein the code is further executed to:
receive from the at least one host system a packet in the fabric protocol encapsulating a read or write request in the logical device interface protocol directed to a target virtual namespace;
determine a physical namespace and storage device including the physical namespace to which the target virtual namespace maps;
generate a modified read or write request in the logical device interface protocol directed to the determined physical namespace to perform the received read or write request; and
send to the determined storage device, using the bus interface protocol, the modified read or write request directed to the determined physical namespace.

14. The system of claim 13, wherein the logical device interface protocol comprises a Non-volatile Memory Express (NVMe) protocol and wherein the bus interface protocol comprises a Peripheral Component Interconnect Express (PCIe) protocol.

15. The system of claim 12, wherein
the at least one virtual namespace comprises two virtual namespaces assigned to different ranges of addresses within one physical namespace in one of the at least one storage device.

16. The system of claim 15, wherein the code is further executed to:
configure, in the memory device, indicate at least one virtual controller in the virtual subsystem, wherein each of the at least one virtual controller is assigned at least one virtual namespace.

17. A method, comprising:
configuring, in a memory device, a virtual subsystem to provide at least one host system access to at least one storage device coupled with a computer system;
configuring, in the memory device, at least one virtual namespace for the virtual subsystem, the at least one virtual namespace assigned to a plurality of physical namespaces including logical blocks configured in a plurality of physical storage devices coupled with the computer system, each physical namespace to include logical blocks configured in a quantity of physical storage included in the at least one storage device; and assigning at least one host system to the at least one virtual namespace, wherein the at least one virtual namespace indicates at least one physical namespace and at least one storage device including the at least one physical namespace to which the at least one virtual namespace is assigned, and the at least one host system to direct read and write requests to the at least one physical namespace of the at least one storage device assigned to the at least one virtual namespace.

18. The method of claim 17, wherein the at least one virtual namespace indicates at least two physical namespaces in the at least one storage device.

19. The method of claim 17, wherein target system, the at least one host system, and the at least one storage device implement a logical device interface protocol to communicate read and write requests between the at least one host system and the at least one storage device, wherein the target system communicates with the at least one host system using a fabric protocol and wherein the targets system and the at least one storage device communicate using a bus interface protocol, the method further comprising:

receiving from the at least one host system a packet in the fabric protocol encapsulating a read or write request in the logical device interface protocol directed to a target virtual namespace;

determine a physical namespace and storage device including the physical namespace to which the target virtual namespace maps;

generating a modified read or write request in the logical device interface protocol directed to the determined physical namespace to perform the received read or write request; and sending to the determined storage device, using the bus interface protocol, the modified read or write request directed to the determined physical namespace.

20. The method of claim 19, wherein the logical device interface protocol comprises a Non-volatile Memory Express (NVMe) protocol and wherein the bus interface protocol comprises a Peripheral Component Interconnect Express (PCIe) protocol.

21. The method of claim 18, wherein the at least one virtual namespace comprises two virtual namespaces assigned to different ranges of addresses within one physical namespace in one of the at least one storage device.

22. The method of claim 21, further comprising:

configuring, in the memory device, at least one virtual controller in the virtual subsystem, wherein each of the at least one virtual controller is assigned at least one virtual namespace.

* * * * *

UNITED STATES PATENT AND TRADEMARK OFFICE
CERTIFICATE OF CORRECTION

| | |
|---|---|
| PATENT NO. | : 11,429,280 B2 |
| APPLICATION NO. | : 16/847095 |
| DATED | : August 30, 2022 |
| INVENTOR(S) | : James P. Freyensee et al. |

It is certified that error appears in the above-identified patent and that said Letters Patent is hereby corrected as shown below:

In the Claims

Column 18, Lines 55-56 Claim 16 reads:
"configure, in the memory device, indicate at least one virtual controller"

Should read:
configure, in the memory device, at least one virtual controller

Signed and Sealed this
Twenty-fifth Day of April, 2023

Katherine Kelly Vidal
*Director of the United States Patent and Trademark Office*